United States Patent

[11] 3,634,180

[72] Inventors Anthony DeCosmo;
Kenneth R. Powell, both of Lexington, Ky.;
Si I. Spiegel, Briarcliff Manor, N.Y.
[21] Appl. No. 814,931
[22] Filed Apr. 10, 1969
[45] Patented Jan. 11, 1972
[73] Assignee American Technical Industries, Inc.
Mount Vernon, N.Y.

[54] ARTIFICIAL TREE AND METHOD OF ASSEMBLY
5 Claims, 4 Drawing Figs.

[52] U.S. Cl............................................................. 161/24,
47/47, 161/31, 248/27.8
[51] Int. Cl............................................................ A41g 1/00
[50] Field of Search........................................... 161/23–24,
27, 22, 26, 31, 21; 248/27.8; 47/47

[56] References Cited
UNITED STATES PATENTS

| | | | |
|---|---|---|---|
| 3,212,953 | 10/1965 | Grunder........................ | 161/26 |
| 1,769,198 | 7/1930 | Albany.......................... | 161/27 UX |
| 2,774,165 | 12/1956 | Smith............................ | 161/24 |
| 1,555,475 | 9/1925 | Maunz........................... | 161/27 X |

*Primary Examiner*—Philip Dier
*Attorney*—Sandoe, Hopgood and Calimafde

ABSTRACT: The invention is an artificial tree wherein the branches are anchored between four parallel wires arranged in quadrature. The tree is assembled by piling the branches between two V-shaped wires set in orthogonal planes, then bringing the ends of the wires together locking the branches in place.

PATENTED JAN 11 1972

3,634,180

INVENTORS
ANTHONY DeCOSMO
KENNETH R. POWELL
SI I. SPIEGEL
BY

Sandoe, Hopgood & Calimafde
ATTORNEYS

ARTIFICIAL TREE AND METHOD OF ASSEMBLY

BACKGROUND

The invention is in the field of artificial trees or shrubs; and has particular application in the making of assembling the same.

In the artificial tree industry it is desirable to be able to assemble a tree or shrub in as simple and expeditious a manner as possible, and still produce a tree or shrub of desired shape and fullness. One of the problems to be overcome in the construction of the trees is how to fasten the branches securely to the trunk. This is particularly true where it is desired that the branches arc upward, which gives them a greater tendency to twist into the drooping position.

Prior art methods of assembly have often required placing each branch in a separate receiving recess in the trunk Such a process requires the production of a trunk with receiving recesses therein, and the time-consuming process of placing each branch in place.

Another prior art method of assembly calls for the branches to be twisted between two heavy wires. This construction requires all branches to be assembled at one point, precludes the use of preshaped branches, and is generally slower and more difficult than construction in accordance with the teachings herein.

In addition, twisting of the wires cracks the paint therein causing it to peel and permitting the main stem to rust.

It is an objective of the invention to provide an artificial tree in which all of the branches are secured within the trunk by a single operation.

Another objective of the invention is to provide an artificial tree having a trunk which is inexpensive to manufacture.

Still another objective of the invention is to speed assembly of the tree by providing a trunk which facilitates placement of the branches therein.

A further objective of the invention is to provide a tree with a trunk having integral base extensions which form a stand for the tree.

SUMMARY

Basically the invention comprises a tree assembled by placing a plurality of V-shaped wires together in a conical array with the wires being substantially equally spaced from one another. The branches of the tree are then piled, top branches first, through the open ends of the V-shaped wires; and the tree is formed by pulling the ends of the V-shaped wires together, closing the V's and locking the branches therebetween. The wire ends are then clamped together by a suitable clamp. The ends of the wires are bent out to form feet upon which the tree can stand or be mounted.

The invention has the following further advantages.

The trunk of the tree can be formed simply of two preformed V-shaped wires, with the ends thereof bent outward to form a base for the tree.

The branches of the tree can be simply piled between the trunk wires during assembly, and need not be individually fitted into the trunk.

A firm footing for the tree is provided by the outturned ends of the trunk wires.

Other objectives, advantages, and various further features of novelty and invention will be pointed out or will occur to those skilled in the art from a reading of the following specification in conjunction with the accompanying drawings.

DETAILED DESCRIPTION OF A PREFERRED EMBODIMENT OF THE INVENTION

Figure 1:
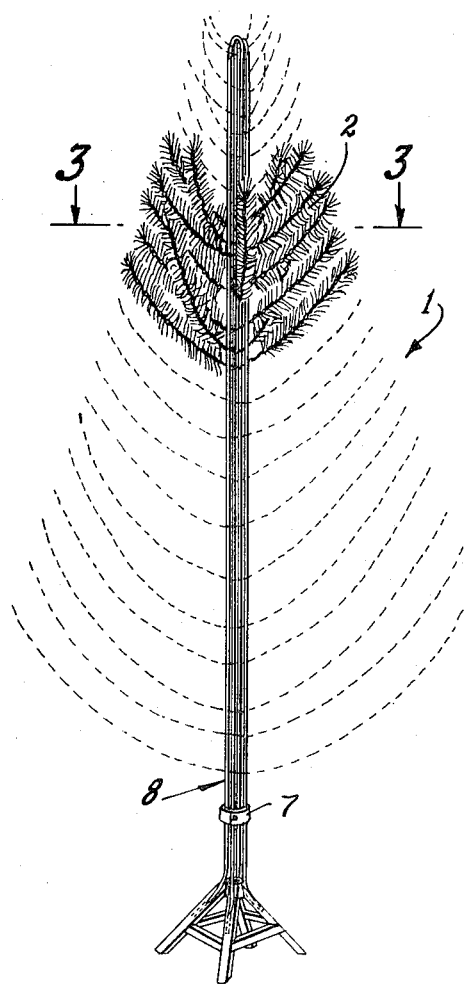
FIG. 1 is a front view of a tree of the invention.

Referring now to FIG. 1, a tree 1 constructed according to the teachings of the invention is illustrated. Branches 2 of the tree are held in place by being tightly pressed between four vertical strands of wire 3, 4, 5 and 6, which form the trunk 8 of the tree 1 as explained below.

The tree trunk wires 3–6 are held tightly together at the base of the trunk 8 by a wraparound metal clip 7.

Each of the trunk wires 3–6 is bent radially outward through a substantial angle at the base of the trunk forming a symmetrical pattern of legs to support the tree.

Figure 2:
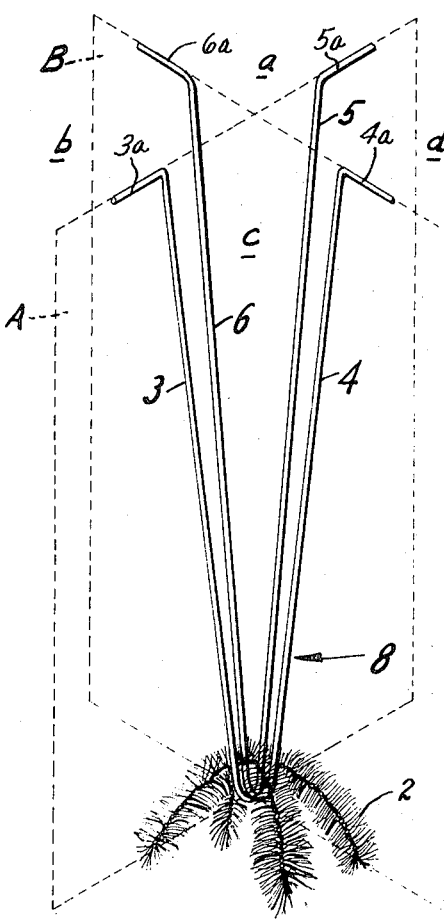
FIG. 2 is a perspective view of the trunk of a tree of the invention prior to insertion of branches and assembly as taught by the invention.

FIG. 2 illustrates the trunk wires 3–6 of the tree positioned in quadrature to receive the branches 2. Wires 3–5, and 4–6, are each single, substantially V-shaped, preformed wires. To assemble the tree 1, one V-shaped wire (e.g., 3–5) lying in a vertical plane A is placed inside the "V" of the other wire (4–6) lying in a vertical plane B; plane A being substantially orthogonal to plane B. The vertical axes of the V-shaped wires are aligned so that the wires create a conical cradle with four vertical wires as the sides. The area enclosed by the wires is effectively quartered by planes A and B of the trunk wires 3–5 and 4–6, respectively, forming sectors a, b, c and d thereof. The apexes of the V-shaped wires may be tied together, but need not be.

Figure 3:
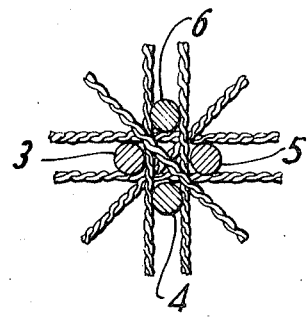
FIG. 3 is an exploded portion of the tree trunk of FIG. 1 illustrating branch retention.

Referring to FIG. 3, with the wires assembled as described in connection with FIG. 2, the branches 2 of the tree are then piled between the trunk wires, with each branch passing between at least two of the trunk wires 3, 4, 5 and 6. The branches 2 are supported in planes A, B, and in sectors a, b, c and d. For example, by placing a branch between wires 4 and 3–5, or 6 and 3–5, the branch will be supported in plane A; or, by running a branch between wires 3 and 6, and between wires 4 and 5 the branch will be supported in sectors b and d. It should be noted that assembly is facilitated if double-ended branches, such as branch 2 in FIG. 2, are utilized. Double-ended branches which curve upwardly upon the tree, will droop when inverted and support themselves in position between the trunk wires until the trunk wires 3, 4, 5 and 6 are closed locking them in place. The stem of the branches, where they are grasped by the trunk, can be flattened to further prevent the branches from twisting in the trunk, but this is not ordinarily necessary.

The tree is assembled upside down. The short upper branches are laid between the trunk wires, first, and in the inverted position. The remainder of the branches are then placed in position in the desired order, care being taken to assure the desired shape and symmetry of the tree.

Figure 4:
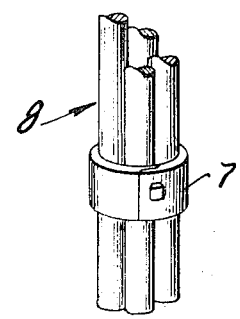
FIG. 4 is a cutaway front view of a portion of a tree trunk of the invention, illustrating a method of assembly thereof.

With all branches in place, the trunk wires 3, 4, 5 and 6 are brought together simultaneously squeezing the branches tightly therebetween. A metal clip 7 or other clamping means is then applied (see FIG. 4) to hold the trunk wires together. This action locks all the branches between the trunk wires, and the assembly can then be inverted to the normal upright position. The clip 7 is placed adjacent to the bottom branches to prevent any possible downsliding when the tree is inverted.

As previously mentioned, the ends of the trunk wires 3–6 are bent out radially from the trunk 8 forming feet 3a, 4a, 5a and 6a for the tree. An angle of bend of 90° is preferable, however, other angles may be adopted for sake of convenience. These feet are invaluable for planting the tree or shrub in the ground, or for embedding in cement or a pot of plaster of paris. A tree or shrub so mounted is difficult or impossible to steal.

The simplicity and ease of assembly of the tree of the invention are apparent from the foregoing description; and the trees of the invention are inherently very full and rich in appearance as the branches fall adjacent one another.

While the principles of the invention have been described in connection with the above specific apparatus, it is to be clearly understood that this description is made only by way of example and not as a limitation to the scope of the invention.

What is claimed is:

1. An artificial tree comprising:

a trunk including first and second V-shaped wires, each of said wires having an apex and a pair of free ends, the apex of one of said wires resting on the apex of the other of said wires, a plurality of branches selectively positioned between at least two of said wires, and means for holding the free ends of said wires together to thereby clamp said branches between said wires.

2. The assembly of claim 1 wherein said branches are double ended.

3. The assembly of claim 1 wherein the ends of said V-shaped wires are bent outwardly forming feet for the tree.

4. The assembly of claim 3, wherein the longitudinal axes of said branches intersect at an angle, said branches are positioned adjacent to one another, and said holding means is positioned adjacent and below the bottom of said branches.

5. A method of assembling an artificial tree in the inverted position, comprised of the steps of:

forming a substantially conical wire cradle having sides comprised of first and second V-shaped wires arranged in substantially perpendicular planes and each having an apex and free ends extending therefrom, the apex of one of said wires resting on the apex of the other of said wires to establish the base of said cradle, supporting said cradle in a vertical position with the apex in a downward position, piling a plurality of branches between said wires, drawing said vertical wires together by pinching the branches therebetween, and clamping the free ends of said wires tightly together.

\* \* \* \* \*